(12) United States Patent
Amini et al.

(10) Patent No.: US 12,177,454 B2
(45) Date of Patent: *Dec. 24, 2024

(54) BATTERY EFFICIENT WIRELESS NETWORK CONNECTION AND REGISTRATION FOR A LOW-POWER DEVICE

(71) Applicant: NETGEAR, Inc., San Jose, CA (US)

(72) Inventors: Peiman Amini, Fremont, CA (US); Joseph Amalan Arul Emmanuel, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,704

(22) Filed: Jan. 13, 2023

(65) Prior Publication Data
US 2023/0148353 A1  May 11, 2023

Related U.S. Application Data

(63) Continuation of application No. 16/278,640, filed on Feb. 18, 2019, now Pat. No. 11,558,626.
(Continued)

(51) Int. Cl.
*H04B 17/318* (2015.01)
*G06F 9/54* (2006.01)
(Continued)

(52) U.S. Cl.
CPC ........... *H04N 19/166* (2014.11); *G06F 9/542* (2013.01); *G06T 7/20* (2013.01); *G06V 20/52* (2022.01);
(Continued)

(58) Field of Classification Search
CPC ................ G08B 13/19695; G08B 5/223; G08B 29/183; G08B 3/10; G08B 13/19669;
(Continued)

(56) References Cited

U.S. PATENT DOCUMENTS 7,460,476 B1  12/2008  Morris et al.
7,539,489 B1   5/2009  Alexander
(Continued)

FOREIGN PATENT DOCUMENTS

CN   102355695 A   2/2012
CN   102811367 A   12/2012
(Continued)

OTHER PUBLICATIONS

"Amazon Kinesis Video Streams Developer Guide", Amazon Web Services, Inc., 2018, 136 pages.
(Continued)

*Primary Examiner* — Mehmood B. Khan
(74) *Attorney, Agent, or Firm* — Perkins Coie LLP (57) ABSTRACT

A client device is configured to communicate with an access point over a wireless network, exchanging data with the access point over a selected communication channel. After the wireless connection to the access point has ended, the client device receives a probe from the access point over a low-level layer, such as a data link layer. In response to receiving the probe, the client device reconnects to the access point.

18 Claims, 4 Drawing Sheets

Related U.S. Application Data (60) Provisional application No. 62/633,017, filed on Feb. 20, 2018.

(51) Int. Cl.

| | | |
|---|---|---|
| G06T 7/20 | (2017.01) | |
| G06V 20/52 | (2022.01) | |
| G07C 9/37 | (2020.01) | |
| G08B 3/10 | (2006.01) | |
| G08B 5/22 | (2006.01) | |
| G08B 13/191 | (2006.01) | |
| G08B 13/193 | (2006.01) | |
| G08B 13/196 | (2006.01) | |
| G08B 21/18 | (2006.01) | |
| G08B 27/00 | (2006.01) | |
| G08B 29/18 | (2006.01) | |
| H04B 17/391 | (2015.01) | |
| H04L 1/00 | (2006.01) | |
| H04L 5/00 | (2006.01) | |
| H04L 43/0852 | (2022.01) | |
| H04L 43/12 | (2022.01) | |
| H04L 43/16 | (2022.01) | |
| H04L 65/612 | (2022.01) | |
| H04L 65/65 | (2022.01) | |
| H04L 65/80 | (2022.01) | |
| H04L 67/1087 | (2022.01) | |
| H04N 7/12 | (2006.01) | |
| H04N 7/18 | (2006.01) | |
| H04N 17/00 | (2006.01) | |
| H04N 19/103 | (2014.01) | |
| H04N 19/124 | (2014.01) | |
| H04N 19/156 | (2014.01) | |
| H04N 19/166 | (2014.01) | |
| H04N 19/184 | (2014.01) | |
| H04N 19/40 | (2014.01) | |
| H04N 19/42 | (2014.01) | |
| H04N 23/60 | (2023.01) | |
| H04N 23/661 | (2023.01) | |
| H04N 23/68 | (2023.01) | |
| H04N 23/90 | (2023.01) | |
| H04W 24/08 | (2009.01) | |
| H04W 24/10 | (2009.01) | |
| H04W 28/02 | (2009.01) | |
| H04W 52/02 | (2009.01) | |
| H04W 72/0453 | (2023.01) | |
| H04W 72/23 | (2023.01) | |
| H05B 47/105 | (2020.01) | |
| H05B 47/19 | (2020.01) | |
| H04N 7/14 | (2006.01) | |
| H04N 19/00 | (2014.01) | |

(52) U.S. Cl.
CPC ............... *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/19656* (2013.01); *G08B 13/1966* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/661* (2023.01); *H04N 23/665* (2023.01); *H04N 23/6811* (2023.01); *H04N 23/90* (2023.01); *H04W 24/08* (2013.01); *H04W 24/10* (2013.01); *H04W 28/021* (2013.01); *H04W 52/0245* (2013.01); *H04W 52/0261* (2013.01); *H04W 72/0453* (2013.01); *H04W 72/23* (2023.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC .. G08B 27/006; G08B 3/1016; G08B 13/193; G08B 21/182; G08B 13/191; G08B 13/19656; G08B 13/1966; H04L 1/0009; H04L 65/65; H04L 5/0091; H04L 43/0894; H04L 65/61; H04L 65/762; H04L 65/612; H04L 5/0053; H04L 1/0033; H04L 43/10; H04L 65/70; H04L 45/306; H04L 1/0003; H04L 5/0062; H04L 43/0858; H04L 43/12; H04L 65/80; H04L 5/0048; H04L 43/16; H04L 43/20; H04L 1/0017; H04L 67/1093; H04L 61/5038; H04B 17/373; H04B 17/391; H04B 17/318; H04N 7/183; H04N 19/40; H04N 23/6811; H04N 19/184; H04N 17/002; H04N 23/90; H04N 23/665; H04N 19/103; H04N 19/166; H04N 7/12; H04N 23/661; H04N 19/156; H04N 19/124; H04N 19/42; H04N 7/181; H04N 19/00; H04N 7/147; G06F 9/542; H04W 24/08; H04W 52/0261; H04W 24/02; H04W 4/80; H04W 36/0011; H04W 72/23; H04W 48/20; H04W 36/30; H04W 72/0453; H04W 88/18; H04W 76/19; H04W 84/18; H04W 52/0245; H04W 24/10; H04W 28/021; H04W 76/11; H04W 48/16; H04W 76/27; H04W 12/06; H04W 74/08; G06V 40/20; G06V 20/52; H05B 47/19; H05B 47/105; G06T 7/20; G06T 2207/30241; G06T 2207/30232; G07C 9/37; Y02D 30/70
See application file for complete search history.

(56) References Cited

U.S. PATENT DOCUMENTS

| | | |
|---|---|---|
| 7,633,869 B1 | 12/2009 | Morris et al. |
| 8,855,035 B2 * | 10/2014 | Lemoine ............ H04L 12/1886 370/311 |
| 9,179,495 B1 | 11/2015 | Scherzer et al. |
| 9,451,484 B2 | 9/2016 | Boulton |
| 9,712,814 B2 | 7/2017 | Tanaka et al. |
| 9,996,750 B2 | 6/2018 | Campbell |
| 10,033,436 B2 | 7/2018 | Thubert et al. |
| 10,044,104 B1 | 8/2018 | Bartko et al. |
| 10,177,965 B1 | 1/2019 | Joshi et al. |
| 10,425,638 B2 | 9/2019 | Yu et al. |
| RE47,843 E * | 2/2020 | Fujii ...................... H04L 67/14 |

(56) References Cited

U.S. PATENT DOCUMENTS

| | | | |
|---|---|---|---|
| 11,228,792 B1 | 1/2022 | Ram et al. | |
| 2002/0059627 A1 | 5/2002 | Islam et al. | |
| 2002/0099854 A1* | 7/2002 | Jorgensen | H04L 9/40 370/310 |
| 2002/0105921 A1 | 8/2002 | Sawyer et al. | |
| 2002/0181637 A1 | 12/2002 | Nakabayashi | |
| 2003/0055908 A1 | 3/2003 | Brown et al. | |
| 2003/0063277 A1 | 4/2003 | Kennedy et al. | |
| 2003/0193525 A1 | 10/2003 | Nygaard | |
| 2005/0083947 A1* | 4/2005 | Vaarala | H04L 63/0428 370/395.51 |
| 2005/0086569 A1 | 4/2005 | Hiddink et al. | |
| 2005/0169209 A1* | 8/2005 | Miu | H04W 28/0861 370/328 |
| 2006/0075269 A1* | 4/2006 | Liong | H04L 12/12 713/300 |
| 2006/0187873 A1* | 8/2006 | Friday | H04W 48/20 370/328 |
| 2007/0153916 A1 | 7/2007 | Demircin et al. | |
| 2008/0020746 A1 | 1/2008 | Alexandar et al. | |
| 2008/0025378 A1 | 1/2008 | Mahany et al. | |
| 2008/0026748 A1 | 1/2008 | Alexander et al. | |
| 2008/0069104 A1* | 3/2008 | von Eicken | H04L 61/5007 370/392 |
| 2008/0112315 A1 | 5/2008 | Hu et al. | |
| 2008/0320108 A1* | 12/2008 | Murty | H04W 48/20 709/220 |
| 2009/0022222 A1 | 1/2009 | He et al. | |
| 2009/0273679 A1 | 11/2009 | Gere et al. | |
| 2009/0290019 A1 | 11/2009 | Mcnelis et al. | |
| 2010/0080205 A1 | 4/2010 | Hirsch et al. | |
| 2010/0097472 A1 | 4/2010 | Chathukutty et al. | |
| 2010/0109934 A1 | 5/2010 | Drake et al. | |
| 2010/0110899 A1* | 5/2010 | Vanzante | H04L 43/50 370/242 |
| 2010/0208724 A1* | 8/2010 | Booth | H04L 12/66 370/352 |
| 2010/0285753 A1 | 11/2010 | Foegelle | |
| 2011/0159865 A1 | 6/2011 | Nakao | |
| 2011/0320555 A1 | 12/2011 | Qiu et al. | |
| 2012/0210853 A1 | 8/2012 | Abershitz et al. | |
| 2012/0314875 A1 | 12/2012 | Lee et al. | |
| 2013/0021912 A1 | 1/2013 | Finlow-Bates et al. | |
| 2013/0053653 A1 | 2/2013 | Cuddihy et al. | |
| 2013/0089039 A1* | 4/2013 | Vashi | H04W 72/02 370/329 |
| 2013/0128947 A1 | 5/2013 | Fryer et al. | |
| 2014/0026993 A1 | 2/2014 | Bae | |
| 2014/0051379 A1 | 2/2014 | Ganesh et al. | |
| 2014/0064120 A1 | 3/2014 | Sethuraman et al. | |
| 2014/0092755 A1* | 4/2014 | van de Ven | H04W 48/20 370/252 |
| 2014/0115114 A1 | 4/2014 | Garmark et al. | |
| 2014/0169195 A1 | 6/2014 | Hsin et al. | |
| 2014/0169509 A1 | 6/2014 | Tsofe | |
| 2014/0240491 A1 | 8/2014 | Kauniskangas et al. | |
| 2014/0269655 A1 | 9/2014 | Du et al. | |
| 2014/0307707 A1* | 10/2014 | Mestanov | H04W 36/0066 370/331 |
| 2014/0358592 A1 | 12/2014 | Wedig et al. | |
| 2014/0368601 A1 | 12/2014 | Decharms | |
| 2015/0098354 A1 | 4/2015 | Pérez Grovas | |
| 2015/0185857 A1* | 7/2015 | Jung | G06F 3/0346 345/156 |
| 2015/0189176 A1* | 7/2015 | Pacurariu | H04N 23/651 348/143 |
| 2015/0229426 A1 | 8/2015 | Yu et al. | |
| 2015/0312572 A1 | 10/2015 | Owen | |
| 2015/0319411 A1 | 11/2015 | Kasmir et al. | |
| 2015/0349859 A1 | 12/2015 | Emmanuel et al. | |
| 2015/0381310 A1 | 12/2015 | Hammarwall et al. | |
| 2016/0094388 A1* | 3/2016 | Britt, Jr. | H04L 41/0816 370/254 |
| 2016/0105644 A1 | 4/2016 | Smith et al. | |
| 2016/0112935 A1 | 4/2016 | Ahuja et al. | |
| 2016/0114887 A1 | 4/2016 | Zhou et al. | |
| 2016/0125714 A1 | 5/2016 | Kates et al. | |
| 2016/0165620 A1 | 6/2016 | Dagen et al. | |
| 2016/0225158 A1 | 8/2016 | Tsubota et al. | |
| 2016/0243441 A1 | 8/2016 | Garbowski et al. | |
| 2016/0262120 A1* | 9/2016 | Shani | H04W 56/001 |
| 2016/0278104 A1 | 9/2016 | Hiremath et al. | |
| 2016/0337243 A1 | 11/2016 | Cui et al. | |
| 2016/0337426 A1* | 11/2016 | Shribman | H04N 21/6125 |
| 2016/0366702 A1 | 12/2016 | Baba et al. | |
| 2017/0055179 A1 | 2/2017 | Radunovic et al. | |
| 2017/0055254 A1* | 2/2017 | HomChaudhuri | H04W 72/0446 |
| 2017/0063665 A1* | 3/2017 | Casebolt | H04W 76/18 |
| 2017/0070732 A1 | 3/2017 | Roulet et al. | |
| 2017/0078242 A1 | 3/2017 | Nakamura et al. | |
| 2017/0180442 A1 | 6/2017 | Lawrence | |
| 2017/0192700 A1 | 7/2017 | Wozniak | |
| 2017/0237673 A1 | 8/2017 | Law | |
| 2017/0242129 A1 | 8/2017 | Kallankari et al. | |
| 2017/0244712 A1* | 8/2017 | Meredith | H04L 63/0838 |
| 2017/0301201 A1 | 10/2017 | Siann et al. | |
| 2017/0301203 A1 | 10/2017 | Matsuura | |
| 2018/0206176 A1 | 7/2018 | Panteleev et al. | |
| 2018/0254099 A1 | 9/2018 | Beydoun et al. | |
| 2018/0306904 A1 | 10/2018 | Vacanti | |
| 2018/0316573 A1* | 11/2018 | Marshall | H04L 43/0811 |
| 2018/0359727 A1* | 12/2018 | Hori | H04W 76/10 |
| 2018/0375594 A1 | 12/2018 | Kildal et al. | |
| 2018/0376449 A1* | 12/2018 | Webb | G01S 19/46 |
| 2019/0014005 A1 | 1/2019 | Lessmann | |
| 2019/0014388 A1 | 1/2019 | Rutledge et al. | |
| 2019/0036848 A1* | 1/2019 | Kommula | H04L 49/9068 |
| 2019/0109776 A1* | 4/2019 | Li | H04L 41/0895 |
| 2019/0132371 A1 | 5/2019 | Bhat et al. | |
| 2019/0162769 A1 | 5/2019 | Zhao et al. | |
| 2019/0200013 A1 | 6/2019 | Wu et al. | |
| 2019/0202657 A1 | 7/2019 | Li et al. | |
| 2019/0222897 A1 | 7/2019 | Frusina et al. | |
| 2019/0261370 A1 | 8/2019 | Amini et al. | |
| 2019/0282897 A1 | 9/2019 | Posin | |
| 2019/0364505 A1* | 11/2019 | Wang | H04W 52/0235 |
| 2020/0067580 A1* | 2/2020 | Yang | H04B 7/0617 |
| 2020/0344084 A1* | 10/2020 | Shribman | H04L 67/025 |
| 2022/0122149 A1 | 4/2022 | Kim et al. | |

FOREIGN PATENT DOCUMENTS

| | | | |
|---|---|---|---|
| CN | 103493397 A | 1/2014 | |
| CN | 104066146 A | 9/2014 | |
| CN | 105246131 A | 1/2016 | |
| CN | 106534634 A | 3/2017 | |
| CN | 106954026 A | 7/2017 | |
| CN | 107370550 A | 11/2017 | |
| CN | 110177393 A | 8/2019 | |
| CN | 110177835 A | 8/2019 | |
| JP | 2010232819 A | 10/2010 | |
| WO | 2006075052 A1 | 7/2006 | |
| WO | 2009048660 A2 | 4/2009 | |
| WO | WO-2015144016 A1 * | 10/2015 | H04L 43/16 |

OTHER PUBLICATIONS

Ananthanarayanan, Ganesh, et al., "Real-time Video Analytics—the killer app for edge computing", Microsoft Research; IEEE Computer Society, Oct. 2017, 11 pages.

Girshick, Ross, "Fast R-CNN Object detection with Caffe", Microsoft Research, 2015, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, Aug. 14, 2017, 12 pages.

* cited by examiner

FIG. 1A

| CHANNEL NUMBER | LOWER FREQUENCY MHZ | CENTER FREQUENCY MHZ | UPPER FREQUENCY MHZ |
| --- | --- | --- | --- |
| 1 | 2401 | 2412 | 2423 |
| 2 | 2406 | 2417 | 2428 |
| 3 | 2411 | 2422 | 2433 |
| 4 | 2416 | 2427 | 2438 |
| 5 | 2421 | 2432 | 2443 |
| 6 | 2426 | 2437 | 2448 |
| 7 | 2431 | 2442 | 2453 |
| 8 | 2436 | 2447 | 2458 |
| 9 | 2441 | 2452 | 2463 |
| 10 | 2446 | 2457 | 2468 |
| 11 | 2451 | 2462 | 2473 |
| 12 | 2456 | 2467 | 2478 |
| 13 | 2461 | 2472 | 2483 |
| 14 | 2473 | 2484 | 2495 |

FIG. 1B

| CHANNEL NUMBER | FREQUENCY MHZ |
| --- | --- |
| 36 | 5180 |
| 40 | 5200 |
| 44 | 5220 |
| 48 | 5240 |
| 52 | 5260 |
| 56 | 5280 |
| 60 | 5300 |
| 64 | 5320 |
| 100 | 5500 |
| 104 | 5520 |
| 108 | 5540 |
| 112 | 5560 |
| 116 | 5580 |
| 120 | 5600 |
| 124 | 5620 |
| 128 | 5640 |
| 132 | 5660 |
| 136 | 5680 |
| 140 | 5700 |
| 149 | 5745 |
| 153 | 5765 |
| 157 | 5785 |
| 161 | 5805 |
| 165 | 5825 |

BATTERY EFFICIENT WIRELESS NETWORK CONNECTION AND REGISTRATION FOR A LOW-POWER DEVICE

CROSS-REFERENCE TO RELATED APPLICATIONS

This application is a continuation of U.S. patent application Ser. No. 16/278,640, filed Feb. 18, 2019, which claims the benefit of U.S. Provisional Patent Application No. 62/633,017, filed Feb. 20, 2018, which are incorporated herein by reference in their entirety.

TECHNICAL FIELD

This disclosure relates to connecting a low-power wireless device to a wireless network and registering the device in a battery-efficient manner.

BACKGROUND

Wireless access points enable computing devices to communicate with other devices in a network. A computing device can send data to an access point for transmission over the network or receive data from the access point that originated from another device in the network. The access point and computing device may communicate with one another via a plurality of communication channels, each of which represents a logical coupling between the access point and the computing device and specifies a range of frequencies for signals transmitted to or from the devices. The access point and computing device switch between communication channels in response to dynamic conditions, including varying traffic on the channels and changing distances between the access point and device.

Current protocols used by computing devices to connect to and communication with wireless access points are power-intensive. For example, when connecting to an access point, a computing device may send one or more probes to the access point over each of multiple channels. Each of these probes consumes power at the computing device. For low-power devices, such as those operating on a battery without a dedicated power line, connecting to an access point by standard methods can consume excessive power and reduce the amount of time each battery charge will last.

DETAILED DESCRIPTION

An access point and a wireless client device establish a connection over a radio frequency communication channel in a manner that reduces power usage at the client device. Although the wireless device may be any device capable of communication over a network, various embodiments of a wireless device are described herein with respect to a video camera that is capable of capturing video and transmitting the video over a wireless network to a remote server. The video camera may be used, for example, as a home or office security camera that remains in a substantially static position (e.g., at a front door). When the position of the device does not change frequently, the device may not need to connect to and disconnect from wireless access points as frequently as a more mobile device, and may not need to switch channels as frequently. Furthermore, a specialized client device such as a video camera may communicate with the access point infrequently. For example, a video camera triggered by motion may turn on to capture and transmit video data for only a few minutes each day, while otherwise operating in a standby or low-power state. To reduce an amount of power consumed by the client device, the client device and access point can employ various techniques to establish network connections with reduced power consumption. In some cases, the client device can store an identifier of the channel used during a communication session with the access point before the client device switches to the standby state. When the device transitions into an active state, the device can first attempt to reconnect to the same channel. In other cases, the access point can attempt to restore a connection to a client device.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. In addition, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

Figures 1A, 1B, 1C:
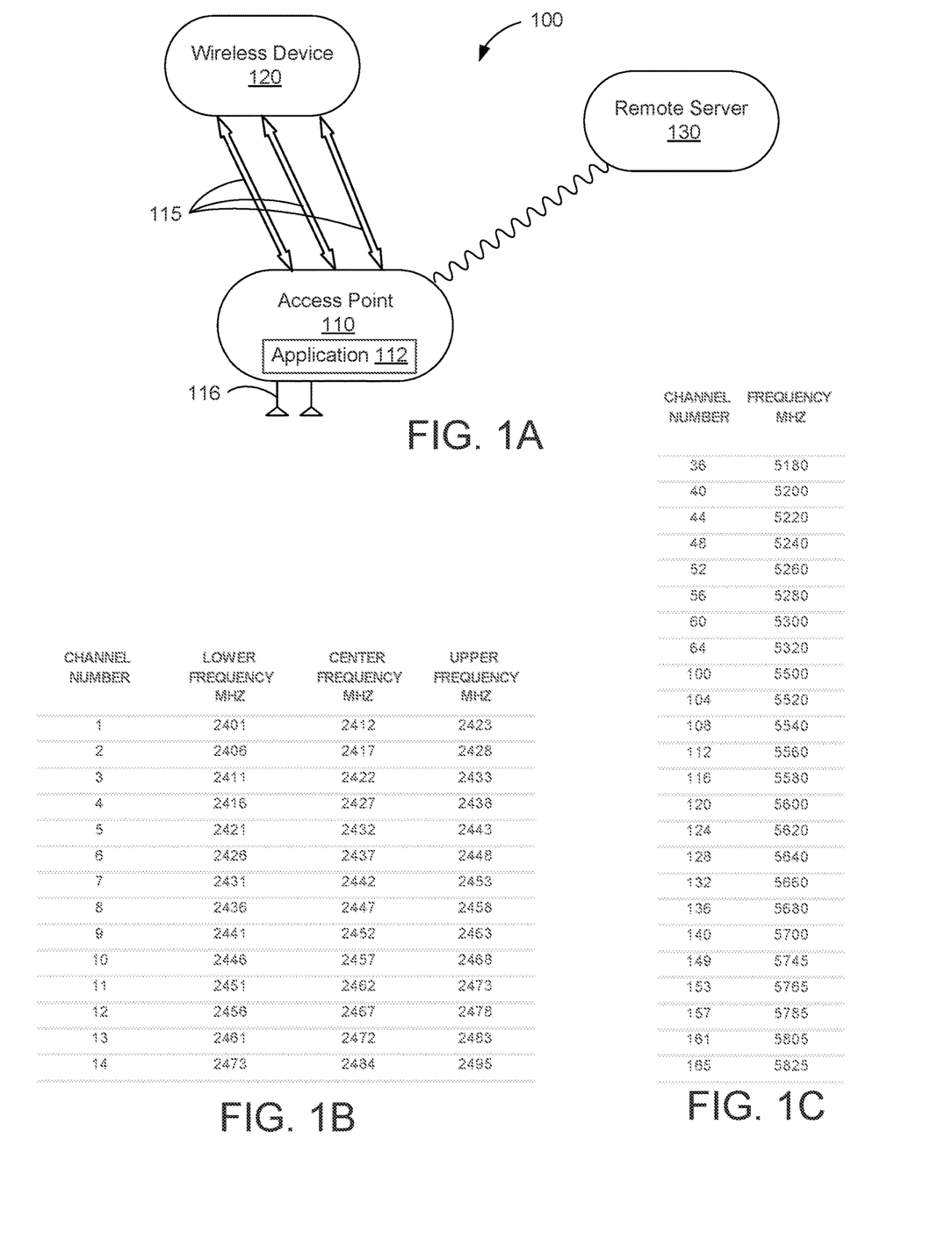
FIG. 1A is a representative computer network environment.
FIG. 1B is a chart listing frequency ranges for channels in a 2.4 GHZ band.
FIG. 1C is a chart listing center frequencies for channels in a 5 GHz band.

FIG. 1A is a representative computer network environment 100 within which some embodiments may be implemented. The environment 100 includes an access point 110, a wireless device 120, and a remote server 130. Additional components not shown in FIG. 1A may also be included in the environment 100. For example, the environment 100 may further include intervening devices (e.g., switches, routers, hubs, etc.) among the access point 110, the remote server 130, and the wireless device 120. Furthermore, the environment 100 may include multiple access points 110, remote servers 130, and/or wireless devices 120.

The wireless device 120 is a computing device communicatively coupled to the access point 110 and remote server 130. In one embodiment, the wireless device 120 is a camera configured to capture and transmit video data. The wireless device 120 can be any suitable network-connected cameras (or "IP cameras"). For example, the wireless device 120 can operate as a security camera in a home or office. In these cases, the wireless device 120 may be relatively static, remaining in approximately the same physical position at most times. It is contemplated that additional examples of the devices 120 equipped with video and audio recording technology can include computing or mobile devices including, for example, smartphones, tablet computers, laptops, personal digital assistants (PDAs), or the like. Additional examples of the devices 120 can include home sensors (e.g., motion detection sensors and temperature sensors) that can connect to the Internet.

The wireless device 120 may be configured to operate in an active, higher-power state and a standby, lower-power state. In the active state, the wireless device 120 can generate or capture data, such as video data, and communicate with other devices. In the standby state, the wireless device 120 may reduce power consumption by not communicating with other devices and turning off one or more components such as a camera and a main processor. When in the standby state, the wireless device 120 also does not send channel probes to the access point 110.

The amount of time the wireless device 120 is in the active state may be relatively low compared to the amount of time the wireless device 120 is in the standby state. For example, the wireless device 120 may remain idle until triggered to capture video data by an input, such as a user input or input from a motion detector. The wireless device 120 may also have a predetermined wake interval, at which time the device switches from the standby state to the active state to check network conditions, transmit any stored data to the access point 110, or perform other tasks. The wake interval can be, for example, eight hours, such that the device 120 becomes active after eight hours if no triggering input has been received in that interval.

The access point 110 enables the wireless device 120 to exchange data to and from the remote server 130. Although not shown for simplicity, the access point 110 may include one or more processors, which may be general-purpose processors or may be application-specific integrated circuitry that provides arithmetic and control functions to implement the techniques disclosed herein on the access point 110. The processor(s) may include a cache memory (not shown for simplicity) as well as other memories (e.g., a main memory, and/or non-volatile memory such as a hard-disk drive or solid-state drive). In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on the access point 110 may execute a plurality of instructions or program codes that are stored in its memory. Some or all of the instructions or program codes executed by the processor can be collectively represented as an application 112. The application 112, when executed by the processor, can manage communication channels used by the access point 110 to communicate with the wireless device 120.

The wireless device 120 can electronically couple to and communicate with the access point 110 wirelessly via a plurality of available communications channels 115. Although only three channels 115 are shown in FIG. 1A, the wireless device 120 and access point 110 may be configured to communicate by any number of channels 115. Each channel 115 represents frequency for signals transmitted between the wireless device 120 and access point 110. The channels 115 may be allocated within one or more frequency bands defining a range of signal frequencies, such as a 2.4 GHz band (including frequencies from 2.4 GHz to 2.5 GHz) and a 5 GHz band (including frequencies from 5 GHz to 6 GHz). FIG. 1B is a chart listing frequency ranges for each of fourteen channels allocated to the 2.4 GHz band, and FIG. 1C is a chart listing center frequencies for each of 24 channels allocated to the 5 GHz band. Some of the channels shown in FIGS. 1B and 1C may be available only in some geographic regions, while other geographic regions may use different or additional channels. The channels 115 may include, by way of example, three channels associated with the 2.4 GHz band: one centered at 2412 MHz (channel 1 in FIG. 1B), one centered at 2437 MHz (channel 6), and one centered at 2462 MHz (channel 11). Similarly, the 5 GHz band may include a plurality of channels distributed across the frequency range defined for the band. One or more of the channels 115 may be allocated to radar systems (referred to as a "DFS channel"), and the wireless device 120 may employ dynamic frequency selection (DFS) to use these channels. When operating in a DFS mode, the wireless device 120 monitors channels for radar signals and, if a signal is detected, automatically switches to another channel to reduce interference with the radar signals.

The access point 110 communicates with the wireless device 120 on one of the channels 115 by transmitting a signal at the channel frequency via an antenna 116 or receiving signals at the channel frequency via the antenna 116. The access point 110 can include multiple antennas 116 configured to receive or transmit data on different channels 115. For example, the access point 110 may have a first antenna 116 configured to communicate on a channel associated with the 2.4 GHz band, while a second antenna 116 is configured to communicate on a channel associated with the 5 GHz band.

The access point 110 can select a particular channel to use to communicate with the wireless device 120 and steer the wireless device 120 to the selected channel. To perform the band steering, the access point 110 listens for probes sent by the wireless device 120 on each available channel 115 and responds to the probe on the selected channel. When the wireless device 120 receives the response, the wireless device 120 may transmit future communications over the selected channel.

Communications between the wireless device 120 and access point 110 can use, for example, the IEEE 802.11 family of standards (e.g., Wireless LAN) and/or other suitable types of area network technologies, such as competing or alternative standards to the IEEE 802.11 family of standards (e.g., WiMAX), and can include any suitable intervening wireless network devices including, for example, base stations, routers, gateways, hubs, or the like. Depending on the embodiments, the network technology connecting between the wireless devices 120 and the access point 110 can include other suitable wireless standards such as the well-known Bluetooth communication protocols or near field communication (NFC) protocols. In some embodiments, the network technology between the devices 120 and access point 110 can include a customized version of WLAN, Bluetooth, or customized versions of other suitable wireless technologies.

The remote server 130 includes one or more computing devices remote from the wireless device 120 and capable of communicating over a network. The wireless device 120 may transmit data to the remote server 130 for storage or use of the data or to enable a user to access the data. For example, the remote server 130 may be a computing device used by a user to view video data captured by the wireless device 120 or to store and analyze data captured or generated by the wireless device 120. As another example, the remote server 130 can include one or more storage devices associated with a cloud storage service and configured to store the data received from the wireless device 120.

In some embodiments, the access point 110 and the remote server 130 may be coupled wirelessly (e.g., which may include employing an IEEE 802.11 wireless network, or a data traffic network based on wireless telephony services such as 3G, 3.5G, 4G Long-Term Evolution (LTE) and the like). The technologies supporting the communications between the access point 110 and the remote server 130 may include Ethernet (e.g., as described in IEEE 802.3 family of standards) and/or other suitable types of area network technologies, such as competing or alternative standards to the IEEE 802.11 family of standards (e.g., WiMAX). Examples of different wireless protocols in the IEEE 802.11 family of standards can include IEEE 802.11a, IEEE 802.11b, IEEE 802.11n, IEEE 802.11ac, IEEE 802.11af, IEEE 802.11ah, and IEEE 802.11ad.

Figure 2:
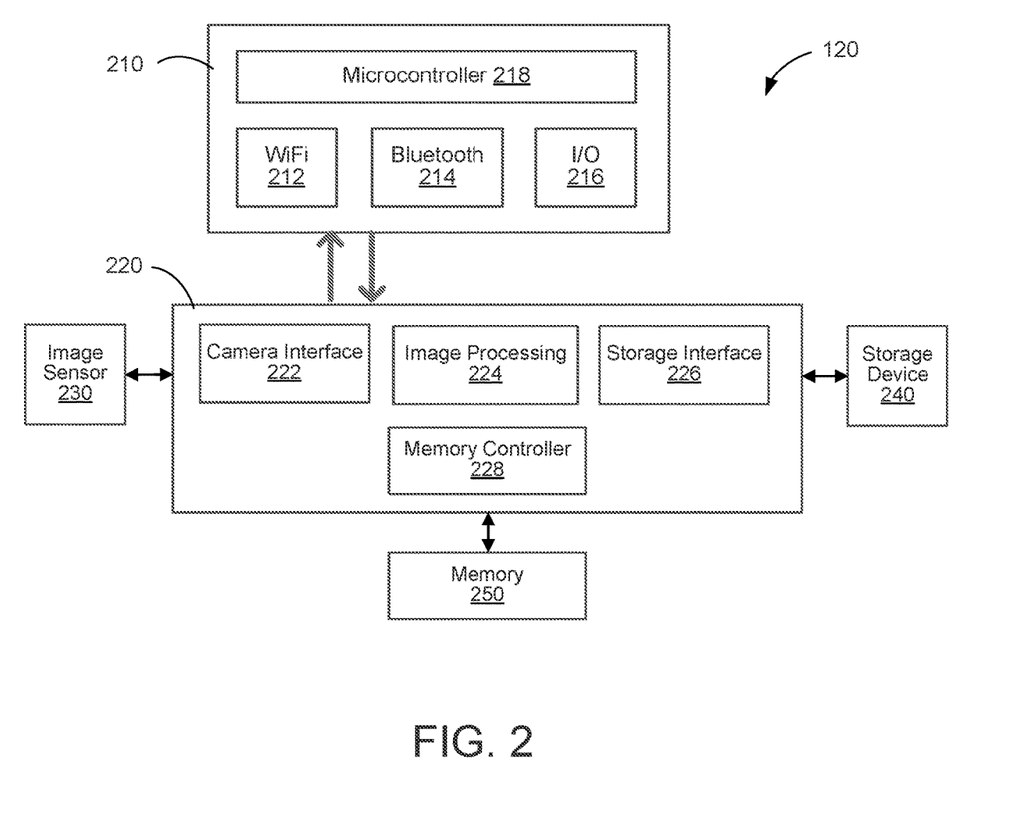
FIG. 2 is a block diagram illustrating components of a wireless device, according to some embodiments.

FIG. 2 is a block diagram illustrating components of the wireless device 120, according to one embodiment. As shown in FIG. 2, the wireless device 120 can include a processing unit 210 and an input/output interface 220. The example wireless device 120 shown in FIG. 2 includes components related to image capture. However, the wireless device 120 can include different or additional components that enable the device to perform functions other than capturing images or video.

The processing unit 210 includes various components for processing data collected by the wireless device 120 and managing communicating between the wireless device 120 and other devices. For example, the processing unit 210 can include wireless communications interfaces such as a WiFi interface 212 and a Bluetooth interface 214. The processing unit 210 can also include a microprocessor 218 and an input/output block 216 that enables communications between the processing unit 210 and the I/O interface 220.

The wireless communications interfaces 212, 214 enable communications between the device 120 and external devices such as the access point 110. In some embodiments, a wireless communications interface (such as the WiFi interface 212) includes a low-power processor that consumes less power than the microprocessor 218 and can perform some functions related to establishing a network connection without powering on the microprocessor 218. For example, the low-power processor can listen for probes or pings from the access point 110.

The microprocessor 218 can be powered on during the active state of the wireless device 120 and powered off during the standby state. The microprocessor 218 can cause data to be transmitted to the access point 110, for example receiving video data from the I/O interface 220 and sending the video data to the access point 110 over the WiFi interface 212. The microprocessor 218 can also establish network connections with the access point 110, transmitting data, probes, or other communications to the access point 110 and receiving communications from the access point 110 to establish a connection.

The microprocessor 218 can measure properties of the communications channels 115 between the wireless device 120 and the access point 110. The measured properties may include channel interference, a signal strength on the channel, capacity of the channel, or a number of dropped packets on the channel. The channel properties can, in some embodiments, be measured by other components of the wireless device 120, such as the low-power processor of the WiFi interface 212.

The I/O interface 220 receives inputs into the wireless device 120 and outputs data from the device 120. As shown in FIG. 2, the I/O interface 220 can include a camera interface 222, an image processing unit 224, a storage interface 226, and a memory interface 228.

The camera interface 222 can receive image or video data from an image sensor 230. The camera interface 222 can control parameters of the image or video data captured by the image sensor 230, such as a frame rate, a resolution, or a duration of video capture. In some cases, the camera interface 222 can trigger the image sensor 230 to capture video data in response to an input to the wireless device 120 such as a user input or a motion input detected by a motion sensor. For example, if the camera interface 222 receives a signal from the motion sensor indicating that motion was detected within a field of view of the image sensor 230, the camera interface 222 turns on the image sensor 230 to capture video data. Alternatively, the camera interface 222 causes the image processing unit 224 to store video or image data in response to motion detection. The camera interface 222 may cause the image sensor 230 to capture video data for a specified length of time, such as ten seconds, in response to each motion incident. Similarly, if video capture is initiated in response to a user input, the camera interface 222 may capture video data for a specified period of time, or may capture video data until a second user input to end video capture is received.

The camera interface 222 can send the image or video data captured by the image sensor 230 to the image processing unit 224 for processing and storage. The image processing unit 224 may encode or compress the video data for storage or transmission using any of a variety of codecs, such as H.264 or H.265.

The memory controller 228 interface with a memory 250 of the wireless device 120, for example to pass image or video data from the image processing unit 224 for storage in the memory 250. The memory 250 is a machine-readable medium including volatile or non-volatile memory devices. The memory 250 can store instructions for execution by the microprocessor 218, the camera interface 222, the image processing unit 224, or other components of the wireless device 120, as well as video data or other data generated by the wireless device 120.

The storage interface 226 interfaces with a storage device 240, which can be internal or external to the wireless device 120. For example, the storage device 240 can include a secure digital (SD) card. In some cases, if the storage device 240 is present, video data captured by the wireless device 120 can be sent to the storage device 240 for storage. If the storage device 240 is not present, the video data can be sent to the memory 250 for temporary storage before transmitting the video data to an external device such as the remote server 130.

Figure 3:
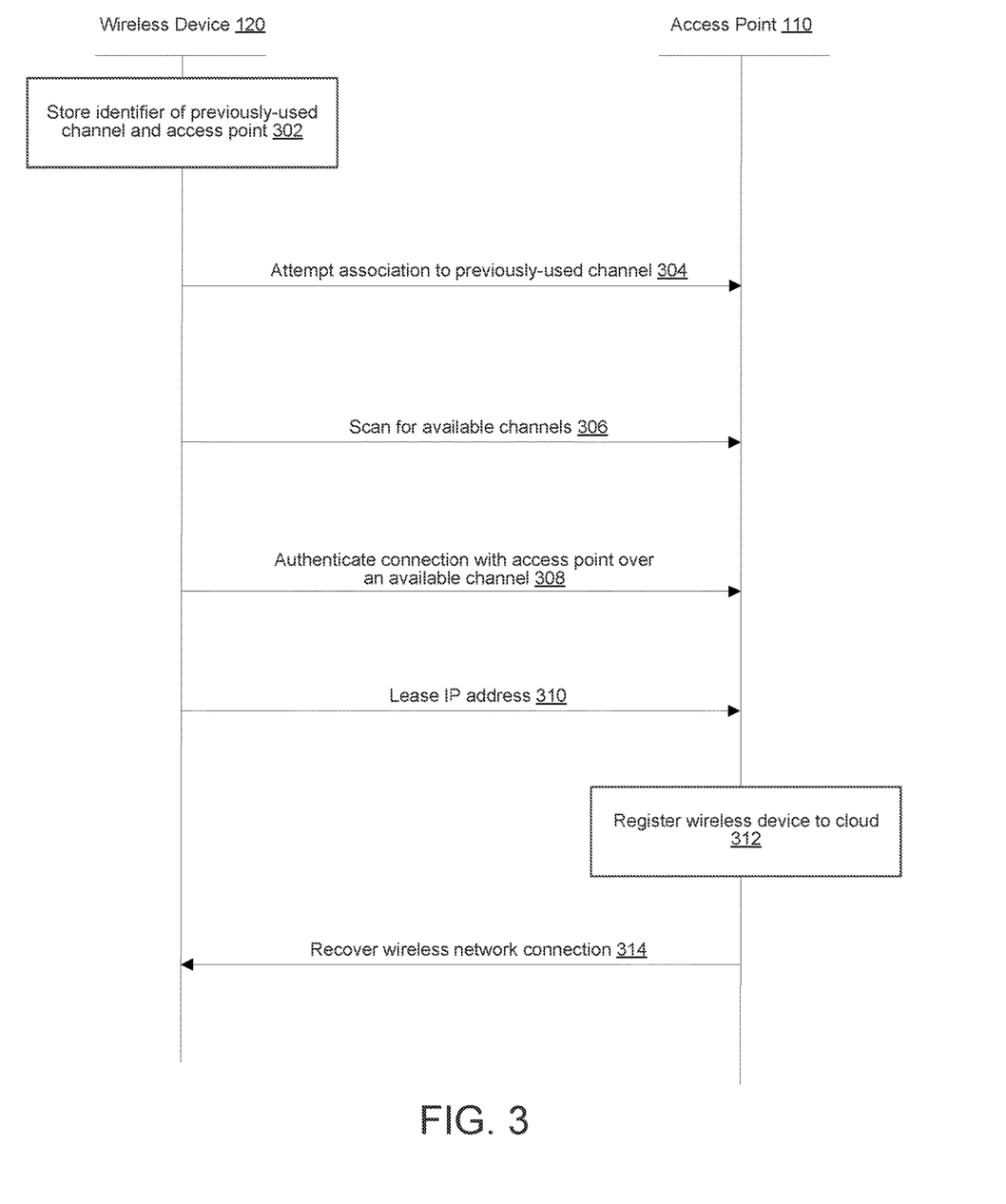
FIG. 3 is an interaction diagram illustrating a process for establishing a wireless network connection between a wireless client device and an access point, according to some embodiments.

FIG. 3 is an interaction diagram illustrating a process for establishing a wireless network connection between the wireless device 120 and access point 110. The process shown in FIG. 3 comprises communications between the wireless device 120 and an access point 110. Arrows indicate a direction of initial communication for each step of the process, but each step may comprise communications in both directions (i.e., from the wireless device 120 to the access point 110 as well as from the access point 110 to the device 120). Furthermore, the process may include communications with more than one access point 110.

As shown in FIG. 3, the wireless device 120 stores 302 an identifier of a previously-used communications channel, as well as an identifier of the access point 110 with which the device 120 communicated. For example, after the device 120 has established a network connection with an access point 110, the device 120 stores information about the channel and access point used for the connection. When the device 120 returns to a standby state, the identifiers of the channel and/or access point can be retained for attempting to re-establish the same connection.

After the initial network connection has ended (for example because the device 120 switched to a standby state), the wireless device 120 may later need to re-establish a network connection. For example, when motion data triggers the device 120 to wake up and begin capturing data, the device 120 initiates a process to connect to a network. Rather than scanning multiple channels to locate an access point, the device 120 first attempts 304 to reconnect to the access point over the channel previously used. Because the relative positions of the device 120 and access point 110 may remain substantially constant, there may be a high likelihood that the device 120 will connect to the same access point 110 each time it re-establishes a network connection. By attempting to reconnect to the same channel previously used to communicate with the access point 110, the device 120 may reduce the amount of power used to establish a network connection. For example, rather than transmitting a probe on multiple channels, which can be a power-intensive process, the device 120 can begin by transmitting a probe only on the previously-used channel. The wireless device 120 can also store settings configured for the previously-used channel, such as a data rate used on the channel, interference settings, or the like.

If the attempt 304 to re-establish the association on the previously-used channel fails, the wireless device 120 can scan 306 for other available channels. In one embodiment, the wireless device 120 passively scans 306 for other channels by listening for a probe from the access point 110 on each of a plurality of channels. If the device 120 receives a probe from the access point 110 on one of the channels, the device 120 can continue the association process on that channel. If the device 120 does not receive any probes from the access point 110, the device 120 can actively scan 306 for other channels by transmitting probes on a plurality of channels. The device 120 can alternatively perform an active scan instead of a passive scan, or may determine whether to perform an active or passive scan based on the type of data to be transmitted to the access point 110. For example, if the device 120 is capturing data to be live-streamed over a network, the device 120 may perform an active scan instead of a passive scan to more quickly establish the network connection.

If the wireless device 120 performs an active scan, properties of the scan may vary depending on network conditions such as signal strength or interference. In some cases, the wireless device 120 can adjust a number of probes transmitted on each channel based on the network conditions. For example, if the device 120 transmits a probe on a first channel and does not receive a response from the access point, the device 120 can measure a signal strength or interference on the channel. If the device 120 measures that a particular channel has an RSSI above a specified threshold or interference below a corresponding threshold, the device 120 can transmit one or more additional probes on the first channel. On the other hand, if the RSSI is low or the interference is high, the device 120 may wait a predetermined amount of time before transmitting another probe on the first channel. Alternatively, the device may continue to transmit probes for a period of time (such as five seconds) and, if no response is received from the access point 110, wait a predetermined amount of time (such as ten seconds) before resuming the attempt to create a network connection.

Once the access point 110 responds to a probe from the wireless device 120 or the device 120 responds to a probe from the access point 110, the device 120 authenticates 308 a connection to the access point over the channel. The device 120 can authenticate to the access point by, for example, WiFi Protected Access (WPA). If authentication fails, the wireless device 120 may retry authenticating the connection. The device 120 dynamically selects a number of retries based on network conditions. In one embodiment, if the device 120 measures an RSSI on the channel that is greater than a specified threshold, the device 120 may retry the authentication for a longer period of time than if the RSSI is below the threshold. For example, the device 120 may retry authenticating for ten seconds if the RSSI is above the threshold but may only retry for five seconds if the RSSI is below the threshold. The device 120 may also balance a number of retries and a duration of each attempt based on the network conditions. For example, if there is high interference on a channel, ten retries back to back may fail. If the device 120 waits a brief period of time between each retry, such as one second, the interference may decrease enough before the next retry to enable authentication. The number of retries under given network conditions can be selected by the wireless device 120. For example, in some interference environments, higher data rates with more retries may be more successful than using a lower data rate. As another example, a low modulation (e.g., using binary phase shift keying (BPSK)) with more retries may be more successful in a long-range environment.

In some embodiments, the wireless device 120 can store data related to the authentication process as the device 120 authenticates the connection to the access point. If the authentication fails, the wireless device 120 can restart or recover the process from the point where it failed or at a step before the point where it failed, rather than entirely restarting the authentication procedure.

After successfully authenticating 308, the wireless device 120 can lease 310 an IP address, for example using the Dynamic Host Configuration Protocol (DHCP). Standard clients typically transmit data packets associated with a DHCP request using the physical layer rate (PHY rate) associated with a wireless link between the client and the access point. However, this rate can be too high for some applications, resulting in packet loss. Retransmitting lost packets causes delay and extra energy usage by the client device. Accordingly, to reduce power usage, the wireless device 120 may use a data rate that is lower than the physical layer rate. For example, the wireless device 120 can use a lowest data rate or a data rate associated with a layer higher than the physical layer (e.g., an application layer data rate). In some cases, the wireless device 120 drops to a data rate that is lower than the PHY rate each time the device leases an IP address. In other cases, the wireless device 120 uses a data rate that is equivalent to the data rate used the last time an IP address was leased. If a first attempt to lease an IP address fails, the wireless device 120 can retry the leasing process for a specified amount of time (or a specified number of attempts). In some cases, the number or duration of retries can be selected based on network conditions such as signal strength or interference. For example, if interference on the channel is below a specified threshold, the wireless device 120 can use a higher number of retries than if the interference is above the threshold. Furthermore, in some cases, the wireless device 120 can select a number or duration of retries based on priority of the data that is being communicated. When transmitting higher priority control packets, for example, the wireless device 120 can retry a greater number of times than if the device 120 is transmitting lower-priority data packets.

The first time the wireless device 120 is turned on and connected to the access point 110, the device 120 may be registered to a cloud server such as the remote server 130. Registration can authenticate the device 120 to the cloud server, allowing the device to, for example, transmit data to the cloud server, receive data from the server, or communicate with other devices a user has registered. The access point 110 can register 312 the device 120 to the server, or the device 120 can register to the server without passing data through the access point 110. In some embodiments, the wireless device 120 transmits data during the registration process at a higher data rate than is used for other steps of the process shown in FIG. 3. For example, the data rate can be higher than the data rate used to lease an IP address. Furthermore, in some embodiments, the wireless device 120 can apply a power setting not used in other steps. For example, the wireless device 120 may remain in an active state until the registration is complete, even if the registration fails one or more times after a first attempt.

If the network connection between the device 120 and access point 110 is lost, the access point 110 may initiate a process to recover 314 the connection. In some cases, the access point 110 may attempt to recover 314 the connection by probing the wireless device 120 by low-layer hardware, for example over a data link layer.

If the low-layer probe fails, the access point 110 may attempt to recover 314 the connection by pinging the device 120 in the Internet layer. If the device 120 does not respond to the ping, the access point 110 may transmit a WiFi data probe to the device 120. The WiFi data probe can include, for example, one or more small data packets (e.g., null data packets) or a management frame. If the device 120 responds to either the ping or the probe, the access point 110 and wireless device 120 can reestablish a communication session.

In some cases, the access point 110 can attempt to recover 314 the connection by sending a basic service set transition management (BTM) frame to the wireless device 120. The BTM frame, as defined for example by the 802.11v standard, may typically be used either to instruct a client device to transition to a specific access point, or to provide the client device with a list of preferred access points. For example, a first access point may send a client device a BTM request frame with instructions to transition to a second access point in order to better balance a network load. When the client device receives the BTM request frame, it may disassociate from the first access point and attempt to connect to the second access point. In some embodiments, by sending the wireless device 120 a BTM frame, the access point 110 can cause the device 120 to reinitiate a network connection to the access point 110.

If the network connection has still not been recovered, the access point 110 may blacklist the device 120. Because the device 120 operating in the standby mode may attempt to communicate with the access point 110 over low-layer communications without switching to the active mode, blacklisting the device 120 can force the device 120 into active mode. When the device 120 becomes active, it may perform its usual steps to identify and connect to the access point 110, thereby reinitiating a network connection with the access point.

If blacklisting fails, the access point 110 can attempt to recover 314 the connection by pausing beacon transmission for a specified period of time. Under normal operation, the access point 110 may broadcast a beacon at periodic intervals, such as once every 100*ms*. If the wireless device 120 does not receive the beacon within a predetermined number of these broadcast intervals, the device 120 is configured to turn on and actively or passively scan for the access point 110. As a result, if the access point 110 stops sending a beacon for five beacon intervals, for example, the wireless device 120 detects that the beacon has not been received and begins scanning for the access point 110. The access point 110 can then respond to the probe from the wireless device 120 and reauthenticate the connection.

Finally, if the connection has still not been restored, the access point 110 can restart a WiFi signal. Restarting the signal can force the wireless device 120 to reconnect to the access point 110.

Figure 4:
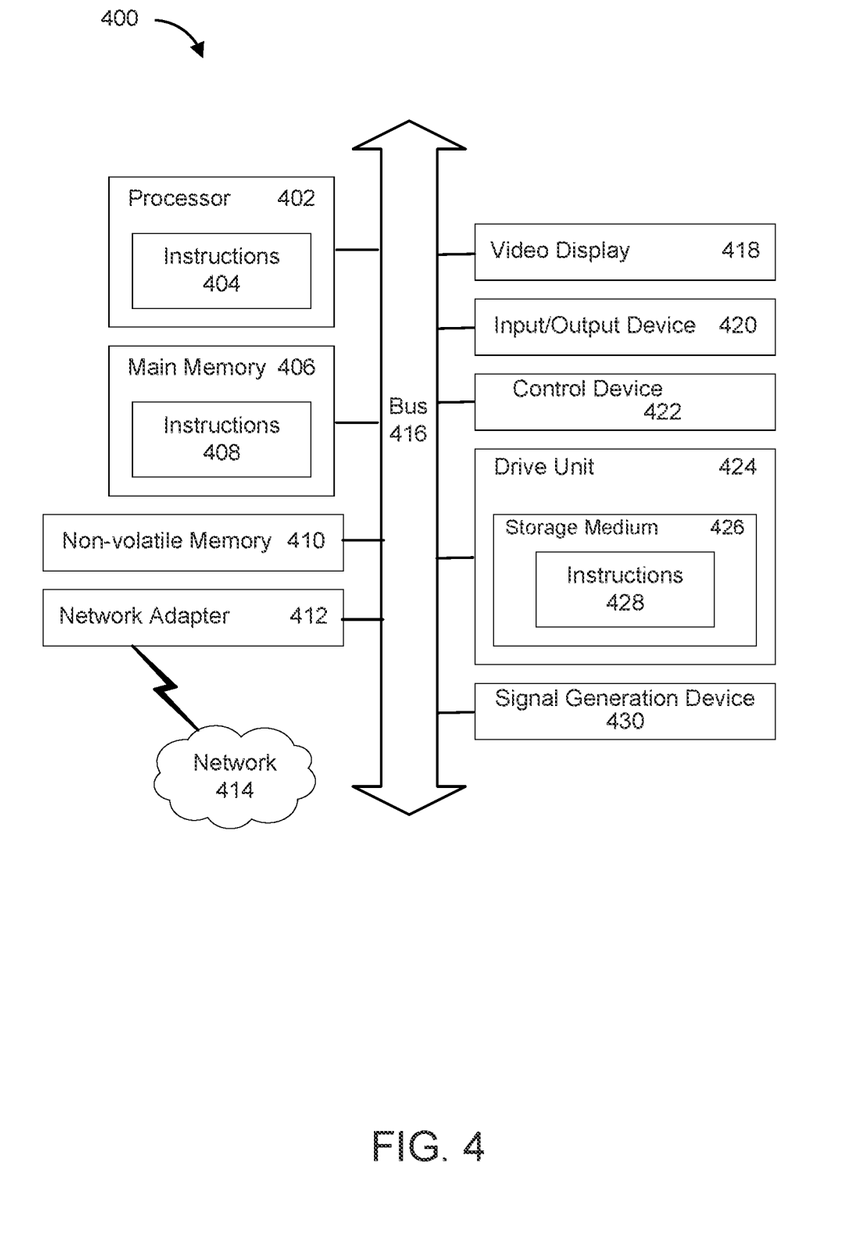
FIG. 4 is a block diagram illustrating an example processing system in which at least some operations described herein can be implemented.

FIG. 4 is a block diagram illustrating an example of a processing system 400 in which at least some operations described herein can be implemented. The processing system 400 may include one or more central processing units ("processors") 402, main memory 406, non-volatile memory 410, network adapter 412 (e.g., network interfaces), video display 418, input/output devices 420, control device 422 (e.g., keyboard and pointing devices), drive unit 424 including a storage medium 426, and signal generation device 430 that are communicatively connected to a bus 416. The bus 416 is illustrated as an abstraction that represents any one or more separate physical buses, point to point connections, or both connected by appropriate bridges, adapters, or controllers. The bus 416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 494 bus, also called "Firewire."

In various embodiments, the processing system 400 operates as part of a user device, although the processing system 400 may also be connected (e.g., wired or wirelessly) to the user device. In a networked deployment, the processing system 400 may operate in the capacity of a server or a client machine in a client-server network environment, or as a peer machine in a peer-to-peer (or distributed) network environment.

The processing system 400 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 400.

While the main memory 406, non-volatile memory 410, and storage medium 426 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 404, 408, 428) set at various times in various memory and storage devices in a computer, and that, when read and executed by one or more processing units or processors 402, cause the processing system 400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 410, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 412 enables the processing system 400 to mediate data in a network 414 with an entity that is external to the processing system 400 through any known and/or convenient communications protocol supported by the processing system 400 and the external entity. The network adapter 412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

It should also be understood that all block diagrams in the figures are for illustration purpose only, and should not preclude the scope of this invention to include any logic equivalents or combinations thereof, including removing, substituting, or adding other logic gates that achieves the same or similar functions consistent with the features of the present invention. Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

The invention claimed is:

1. A client device, comprising:
 a microprocessor having an active state and a standby state, wherein the microprocessor is configured to exchange data with an access point over a wireless network connection while operating in the active state; and
 a wireless interface including a low-power processor, wherein the low-power processor is configured to:
  while the microprocessor is in the standby state, detect a probe received from the access point over a data link layer between the wireless interface and the access point;
  in response to receiving the probe, cause the microprocessor to enter the active state,
   wherein the microprocessor is configured to reconnect to the access point upon re-entering the active state; and
  cause the microprocessor to transmit data packets to the access point to lease an internet protocol (IP) address, the data packets transmitted at a data rate that is less than a physical data rate associated with a wireless link between the client device and the access point.

2. The client device of claim 1, wherein the client device comprises a camera that is controlled by the microprocessor to capture image data when the microprocessor is in the active state.

3. The client device of claim 2, further comprising a motion sensor;
wherein the low-power processor triggers the microprocessor to switch from the standby state to the active state in response to detecting motion by the motion sensor.

4. The client device of claim 1, wherein the client device comprises an Internet-of-Things device.

5. The client device of claim 1, wherein reconnecting to the access point comprises:
transmitting to the access point, on each of a plurality of wireless communication channels, a probe to request a connection to the access point via a corresponding wireless communication channel; and
responsive to a response probe received from the access point on a first wireless communication channel of the plurality of wireless communication channels, sending communications to the access point on the first wireless communication channel.

6. The client device of claim 1, wherein the microprocessor is configured to exchange data with the access point by communicating with the access point over a selected wireless communication channel, and wherein reconnecting to the access point comprises:
transmitting to the access point, via the selected wireless communication channel, a probe to request a connection to the access point on the selected wireless communication channel.

7. The client device of claim 6, wherein the microprocessor is further configured to:
responsive to receiving no response from the access point to the probe transmitted via the selected wireless communication channel, passively scan for one or more other wireless communication channels.

8. The client device of claim 6, wherein the microprocessor is further configured to:
responsive to receiving no response from the access point to the probe transmitted via the selected wireless communication channel, transmit a selected number of probes to the access point over each of one or more other wireless communication channels, wherein the selected number of probes is selected based on at least one of a signal strength measured on a respective wireless communication channel or an amount of interference measured on the respective wireless communication channel.

9. The client device of claim 6, wherein the microprocessor is further configured to, responsive to receiving no response from the access point to the probe transmitted via the selected wireless communication channel:
measure a signal strength on the selected wireless communication channel; and
responsive to the signal strength being greater than a threshold, transmit a second probe to the access point via the selected wireless communication channel.

10. The client device of claim 9, wherein the microprocessor is further configured to:
responsive to the signal strength being less than the threshold, transmit a second probe to the access point via the selected wireless communication channel after a predetermined amount of wait time.

11. A method comprising:
at a client device configured to communicate over a wireless network, exchanging data with an access point over a wireless network connection;
ending the wireless network connection to the access point;
after ending the wireless network connection, receiving a probe from the access point over a data link layer;
in response to receiving the probe, reconnecting to the access point; and
transmitting data packets to the access point to lease an internet protocol (IP) address, the data packets transmitted at a data rate that is less than a physical data rate associated with a wireless link between the client device and the access point.

12. The method of claim 11, wherein reconnecting to the access point comprises:
transmitting to the access point, on each of a plurality of wireless communication channels, a probe to request a connection to the access point via a corresponding wireless communication channel; and
responsive to a response probe received from the access point on a first wireless communication channel of the plurality of wireless communication channels, sending communications to the access point on the first wireless communication channel.

13. The method of claim 11, wherein exchanging data with the access point over the wireless network connection comprises communicating with the access point over a selected wireless communication channel, and wherein reconnecting to the access point comprises:
transmitting to the access point, via the selected wireless communication channel, a probe to request a connection to the access point on the selected wireless communication channel.

14. The method of claim 13, further comprising:
responsive to receiving no response from the access point to the probe transmitted via the selected wireless communication channel, passively scanning for one or more other wireless communication channels.

15. The method of claim 13, further comprising:
responsive to receiving no response from the access point to the probe transmitted via the selected wireless communication channel, transmitting a selected number of probes to the access point over each of one or more other wireless communication channels, wherein the selected number of probes is selected based on at least one of a signal strength measured on a respective wireless communication channel or an amount of interference measured on the respective wireless communication channel.

16. The method of claim 13, further comprising, responsive to receiving no response from the access point to the probe transmitted via the selected wireless communication channel:
measuring a signal strength on the selected wireless communication channel; and
responsive to the signal strength being greater than a threshold, transmitting a second probe to the access point via the selected wireless communication channel.

17. The method of claim 16, further comprising:
responsive to the signal strength being less than the threshold, transmitting a second probe to the access point via the selected wireless communication channel after a predetermined amount of wait time.

18. The method of claim 11, wherein the client device has an active operation state and a standby operation state, wherein the client device is configured to exchange data with the access point during the active operation state, and wherein ending the wireless network connection to the access point comprises switching from the active operation state to the standby operation state.

\* \* \* \* \*